G. SYKES.
PACKING DEVICE.
APPLICATION FILED APR. 22, 1919.

1,398,405.

Patented Nov. 29, 1921.

WITNESS
J.H. Morgan

INVENTOR
GEORGE SYKES.
BY White & Prost
his ATTORNEYS

UNITED STATES PATENT OFFICE.

GEORGE SYKES, OF PENRYN, CALIFORNIA, ASSIGNOR TO SYKES STANDARD FRUIT WRAP COMPANY, OF PENRYN, CALIFORNIA, A CORPORATION OF CALIFORNIA.

PACKING DEVICE.

1,398,405.   Specification of Letters Patent.   Patented Nov. 29, 1921.

Application filed April 22, 1919. Serial No. 291,996.

*To all whom it may concern:*

Be it known that I, GEORGE SYKES, a citizen of the United States, and a resident of Penryn, Placer county, State of California, have invented a certain new and useful Packing Device, of which the following is a specification.

The invention relates to a device for use in packing fruit in a box.

An object of the invention is to provide means for determining the arrangement of articles in a package in accordance with a predetermined scheme, whereby the largest possible number of such objects may be packed in a given space; whereby the process of packing is expedited and made cheaper and uniform; whereby each article will have a large number of points of support in the pack and internal structural stability produced; whereby the pack may be thoroughly ventilated and whereby the objects are held from contact with each other and partially wrapped.

Another object of the invention is to provide a separator-wrap of the character described portions of which are locally deformable longitudinally and laterally in the plane of the sheet comprising the wrap as well as transversely of said plane so as to permit the sheet to readily accommodate itself to small variations in the size of the fruit to be packed.

The invention is particularly useful in packing fruit such as apples and oranges. In the packing of fruit it is desirable that the pack shall be tight and at the same time contain sufficient voids to allow the proper ventilation. In the fruit packing system now in general use the fruit is arranged in layers, with the pieces in one layer superposed on the pieces in the lower layer, so that each piece of fruit is supported at not more than six points. Such packs considered as a unit have no internal structural stability so that if one piece of fruit decays or shrinks, the adjacent piece becomes loose and this looseness may extend through the entire pack.

In accordance with my invention each piece of fruit in the pack is supported at least at six points and the majority are supported at eight points, producing inherent stability which is not destroyed by the shrinkage or decaying of a piece of fruit.

The invention possesses other objects and features of advantage some of which, with the foregoing, will be set forth at length in the following description, where I shall outline in full that form of the invention which I have selected for illustration in the drawings accompanying and forming part of the present specification.

Referring to said drawings.

Figure 1:
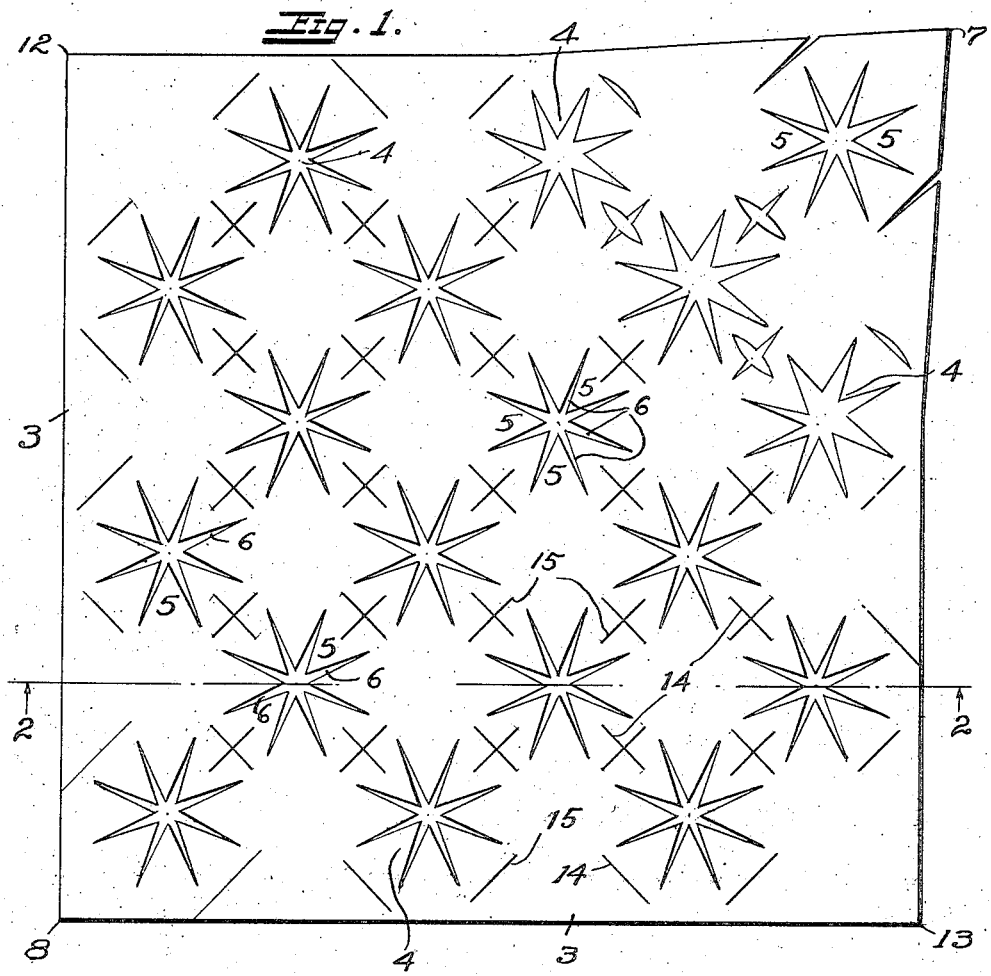
Figure 1 is a plan view of the packing device of my invention showing one side of the sheet expanded or deformed.
Figure 2:
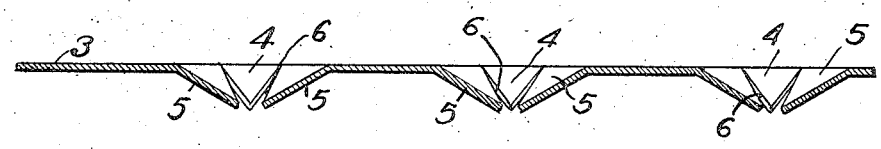
Fig. 2 is a cross section taken on the line 2—2 of Fig. 1.

I have found that by arranging the fruit in layers in the box or package, with the fruit in one layer arranged in parallel rows disposed diagonally of the box and the corresponding fruit in the parallel rows transversely alined and with the fruit in the superposed layers arranged in diagonal rows which cross the lower rows so that the individual pieces of fruit in the upper layer are disposed over the voids between the pieces of fruit in the under layer, that a very uniform and inherently stable pack is produced and that by this method the largest number of pieces of fruit may be packed in a given space. In order that the pieces of fruit in one layer may not contact with the pieces of fruit in another layer and produce the harmful effect of such contact, I have provided a separator sheet 3 which is disposed between the successive layers. The sheet 3 which is preferably made of paper or cardboard is provided with a plurality of indentations 4 which act not only to receive the fruit, but to indicate the proper placing of the fruit.

The paper sheet lying between two layers of fruit is deformed or bent by the pieces of fruit, so that it not only separates the pieces of fruit, but partially wraps them as shown in applicant's co-pending applications Serial No. 149,486 and Serial No. 195,388 filed February 19, 1917, and October 8, 1917, respectively. The paper sheet is of sufficient flexibility to permit it to conform to the pieces of fruit, thereby providing a close tight pack in which the pieces of fruit in one layer are separated from the pieces in the other layers and in which each piece of fruit is partially wrapped.

The indentations may be of any desired form, those in the separator sheets shown comprising a plurality of tongues 5, formed by a plurality of radial cuts 6, and attached to the body of the sheet at their bases, so that when the cut portion is pushed down, the tongues bend downwardly to form the fruit holding depression. The tongues in each depression are so arranged that the point of nearest approach of two adjacent depressions is disposed at the base of a tongue in each depression. The depressions or cut portions are arranged in parallel rows diagonally of the sheet, the center row being arranged diagonally in a line extending from corner 7 to corner 8 of the sheet. The parallel rows are arranged on both sides of the center row and the depressions in the parallel rows are transversely alined with the depressions in the central row. In the separator sheet shown, there are six depressions in the central row, four in each of the adjacent rows and two in each other row. Since the depressions in the successive rows are transversely alined, six transverse rows of depressions are formed, which for convenience will be termed the parallel transverse rows, which are at right angles to the diagonal rows. The two central transverse rows are placed on opposite sides of the diagonal lines connecting the corners 12 and 13. The tongues 5 are so arranged that a diagonal line drawn through the centers of the depressions in either direction will bisect two diametrically disposed tongues in each depression. These diametrically disposed tongues are bent down and lie between and separate the pieces of fruit at their points of contact or support. When two separator sheets are superposed with the depressions in register and the upper sheet is turned 90 degrees in its plane with respect with the lower sheet, the depressions in the upper sheet will be staggered with relation to the depressions in the lower sheet and will lie above the flat surfaces occurring between the depressions in the lower sheet.

The structure just defined gives a degree of conformability to the separator-wrap or sheet which enables it to form pockets in which the pieces of fruit are partially enveloped, but means are provided for augmenting this conformability and for imparting to the sheet as a whole a certain elasticity or expansibility which adapts it to local shifting, displacement or deformation in the plane of the sheet so that the pockets or depressions adjust themselves in the plane of the sheet to small variations in the size of the fruit. That is, if the spacing of the pockets or depressions is fixed, then variations in the size of the fruit may operate to crowd some particular piece of fruit to one side or partially out of the depression in which it would normally seat. This defect is avoided by the capacity for local adjustment of each pocket in the plane of the sheet. In order to impart this quality of expansibility to the sheet, that is the quality of local adjustment in a plane of the sheet, I form the sheet with a plurality of slits 14 in and parallel to the diagonal 12—13, and located in the flat surface of the sheet between the depressions in the transverse rows and between the depressions in the diagonal rows. In and parallel to the diagonal 7—8 I form another group of slits similar to the first group, but at right angles thereto, a slit of the second group intersecting a slit of the first group between each pair of depressions in the diagonal and the transverse rows, but preferably leaving the slits of both groups on the margin of the sheet uncut by the slits of the other group. These slits 14 and 15 in conjunction with the slit 6 permit the separator sheet to be expanded in any direction in the plane of the sheet and also permit portions of the sheet to be shifted or deformed in the plane of the sheet without disturbing the rest of the sheet, so that although the pieces of fruit vary somewhat in shape and size, the pockets or depressions for each piece of fruit will shift or deform locally in the plane of the sheet to seat squarely about the fruit.

In packing fruit, a separator-wrap or sheet having the proper number and spacing of depressions in accordance with the size of the fruit, is laid in the bottom of the box and the first layer of fruit laid on the depressions. A second separator sheet is then laid over the bottom layer with the corner 12 of the second sheet over the corner 7 of the lower sheet and the second layer of fruit placed in the depressions of the second separator sheet and so on until the box is filled. This causes the pieces of fruit in each layer to lie over the void in the layer below, producing a very solid and structurally stable pack.

Instead of using only one separator sheet between each two layers, two sheets may be used, the lower one being turned over so that the depressions extend upwardly in registry with the fruit, and the second separator being placed as the second separator in the above mentioned mode of packing.

I claim:

1. A separator for use in packing fruit comprising a sheet of conformable material having a series of slits therein whereby the sheet is deformable in any direction.

2. A separator for use in packing fruit comprising a sheet of conformable material having a series of slits therein whereby the sheet is deformable in the plane of the sheet.

3. A separator for use in packing fruit comprising a sheet of material having groups of radially disposed intersecting slits, whereby the sheet is rendered expansible in any direction.

4. A separator for use in packing fruit comprising a sheet of material having groups of radially disposed intersecting slits, whereby the sheet as a whole or as to portions thereof is rendered expansible in any direction.

5. A separator for use in packing fruit comprising a sheet of conformable material having groups of radially disposed intersecting slits, whereby the sheet is rendered expansible in any direction, the tongues formed by certain of said intersecting slits being adapted to be depressed to form pockets for the pieces of said fruit.

6. A separator for use in packing fruit comprising a sheet of material having slits cut therein, some of said slits being grouped radially to form tongues adapted to be depressed to form pockets for the pieces of fruit, and others of said slits disposed between said radial groups whereby the pockets are adjustable relative to each other.

7. A separator for use in packing fruit comprising a rectangular sheet of conformable material having a plurality of groups of radial slits therein, the slits of each group radiating from a common center and the groups arranged in rows diagonally of the sheet the tongues formed by said radial slits being depressible to form pockets for the pieces of fruit and intersecting slits in said material between each pair of said pockets whereby the sheet is rendered expansible.

In testimony whereof, I have hereunto set my hand at San Francisco, California, this 16th day of April, 1919.

GEORGE SYKES.

In presence of—
H. G. Prost,
W. W. Healey.